United States Patent [19]

Idemoto et al.

[11] 4,068,268

[45] Jan. 10, 1978

[54] METHOD AND APPARATUS FOR WRITING SERVO-TRACKS ON ROTATING MAGNETIC MEMORY SURFACES

[76] Inventors: Tom Y. Idemoto, 6857 Elwood Road, San Jose, Calif. 95120; C. Norman Dion, 1637 Tiffany Way, San Jose, Calif. 95121

[21] Appl. No.: 647,310

[22] Filed: Jan. 8, 1976

[51] Int. Cl.² .................. G11B 21/12; G11B 21/08
[52] U.S. Cl. ........................... 360/78; 360/75; 360/77
[58] Field of Search ............... 360/66, 77, 78, 106, 360/33, 75; 74/89.14

[56] References Cited

U.S. PATENT DOCUMENTS

| | | | |
|---|---|---|---|
| 3,153,241 | 10/1964 | Ramrath | 360/106 |
| 3,156,906 | 11/1964 | Cummins | 360/77 |
| 3,566,381 | 2/1971 | Buslik | 360/106 |
| 3,631,419 | 12/1971 | Ho | 360/106 |
| 3,701,846 | 10/1972 | Zenzefilis | 360/33 |
| 3,721,967 | 3/1973 | Englert | 360/106 |
| 3,911,483 | 10/1975 | Kihara et al. | 360/33 |
| 3,950,783 | 4/1976 | Herring | 360/106 |

*Primary Examiner*—Jay P. Lucas
*Attorney, Agent, or Firm*—Townsend and Townsend

[57] ABSTRACT

Single and double density servo-tracks are written on the servo-surface of a rotating disc pack with a single transducer carried by a transducer head assembly driven by a screw shaft. The screw shaft is incrementally rotated by a first fixed angular distance and a second fixed angular distance when writing single and double density tracks, respectively. The transducer has a gap width greater than the width of the widest track to be written, and the tracks are sequentially recorded by recording a preliminary track having a width equal to the width of the transducer gap, radially translating the transducer by an amount equal to the desired track width, erasing the portion of the preliminary track overlapping the transducer gap to form a track having the correct width and repeating the recording and erasing steps until all tracks have been so recorded.

The transducer drive apparatus comprises a pair of solenoid operated latching pawls each engageable with a different driven gear secured to the screw shaft and a driving shaft having an input gear driven by a motor and an output gear driven through a slip clutch assembly. The two driven gears are provided with different pitches and each associated latching pawl is disengaged from the corresponding driven gear to permit a predetermined number of teeth to pass the pawl between successive latchings.

14 Claims, 14 Drawing Figures

END STEP 1

END STEP 2

END STEP 3

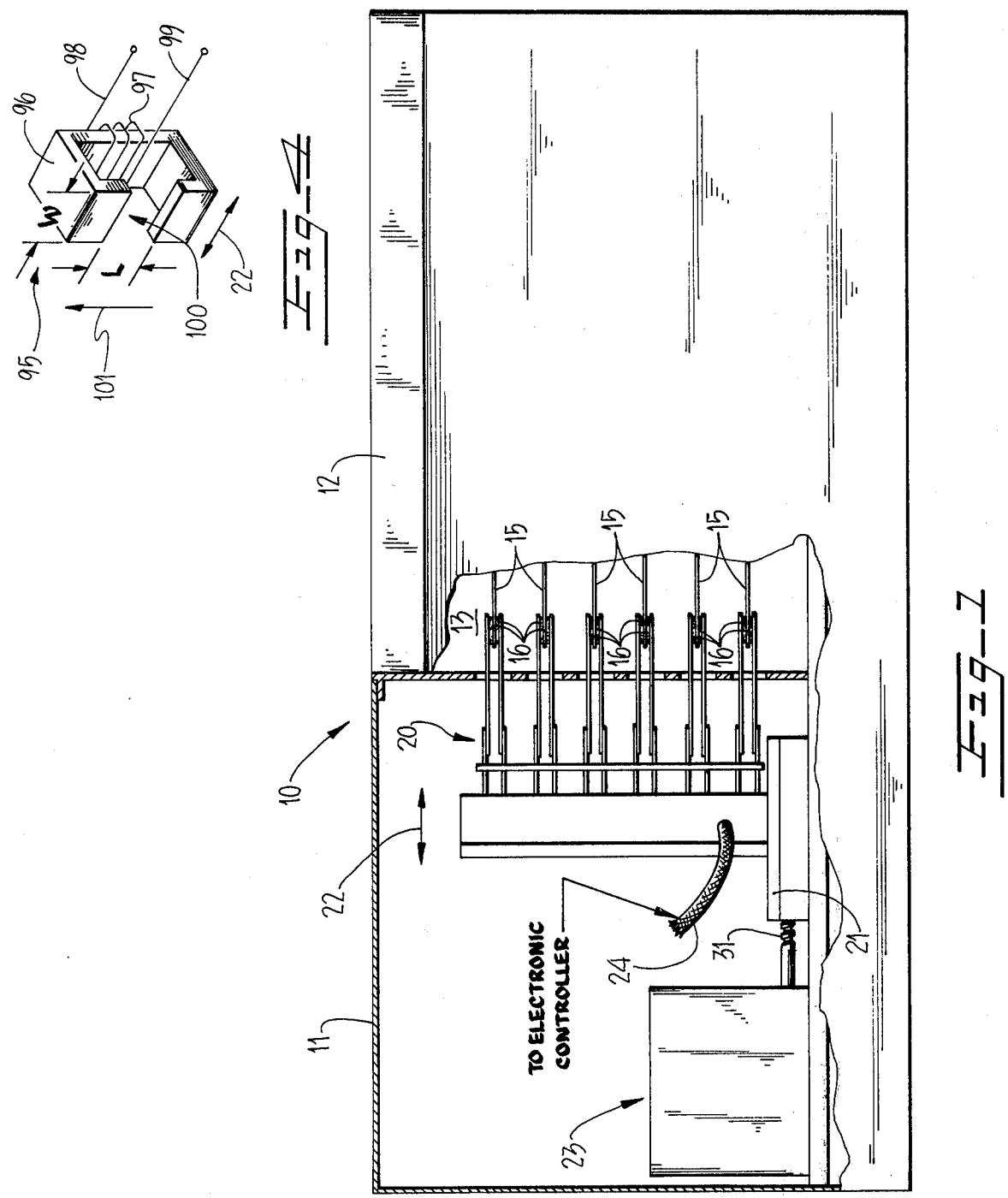

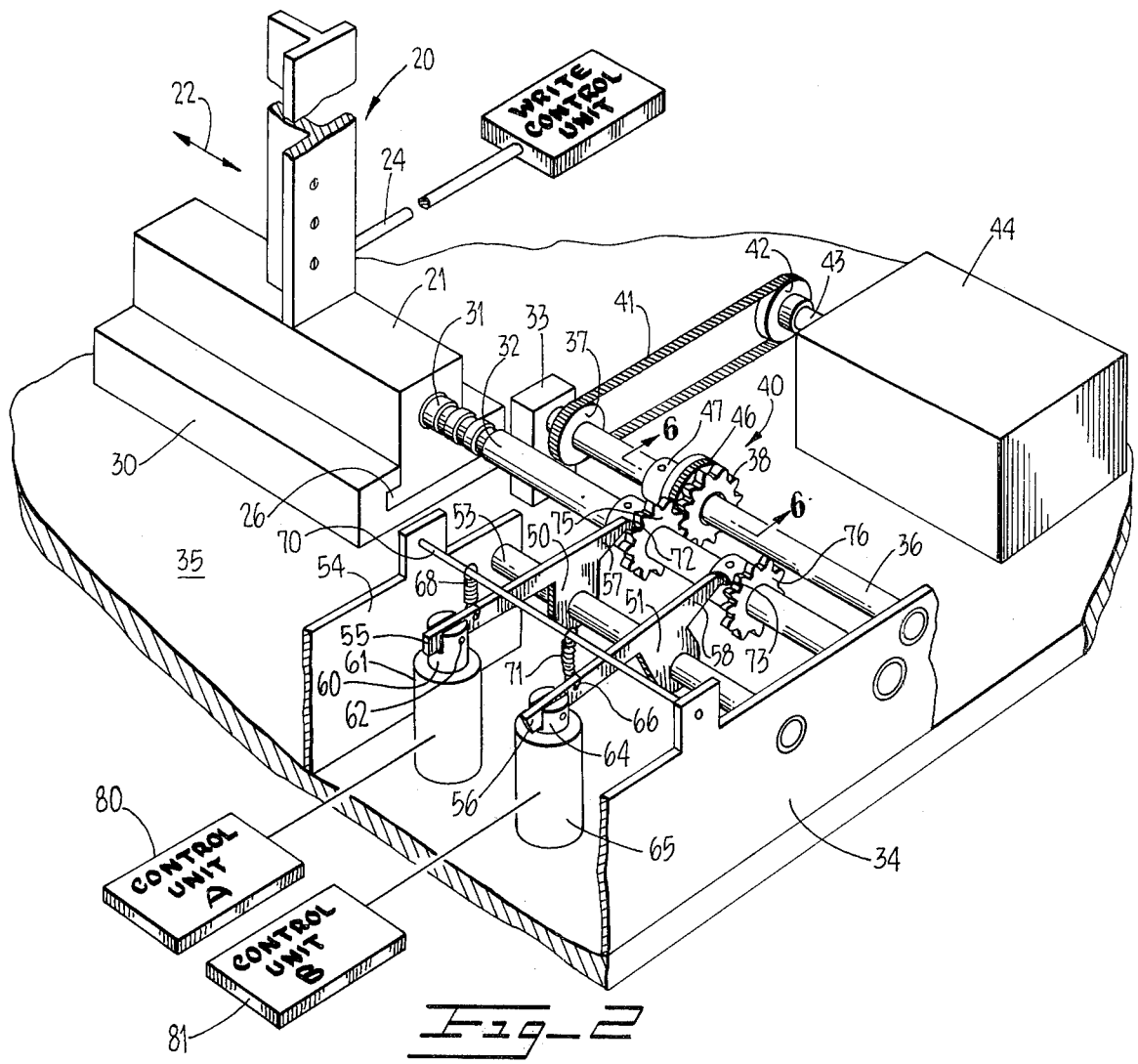
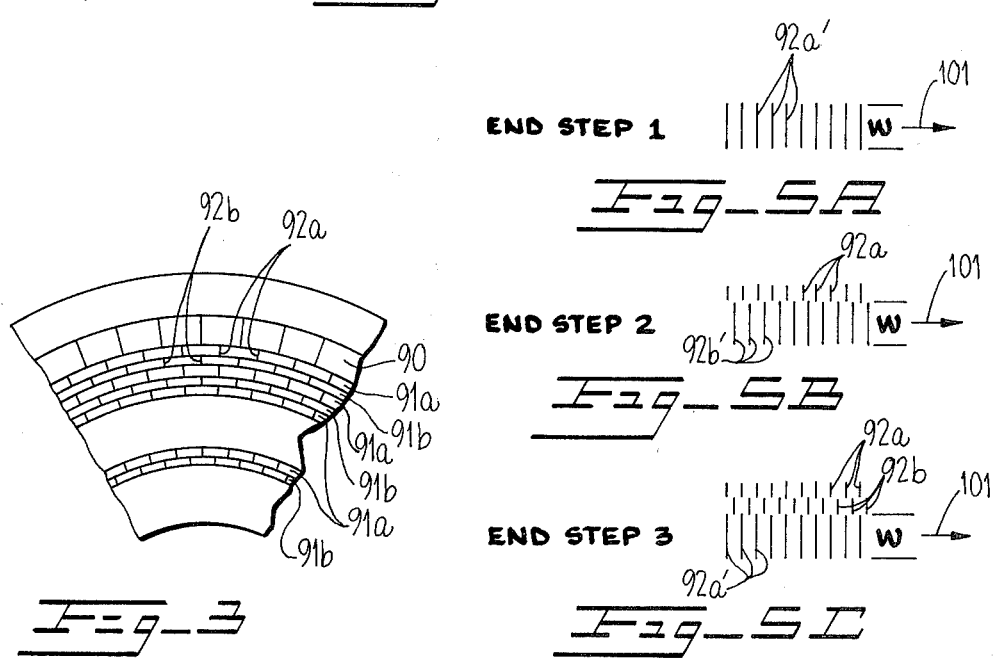

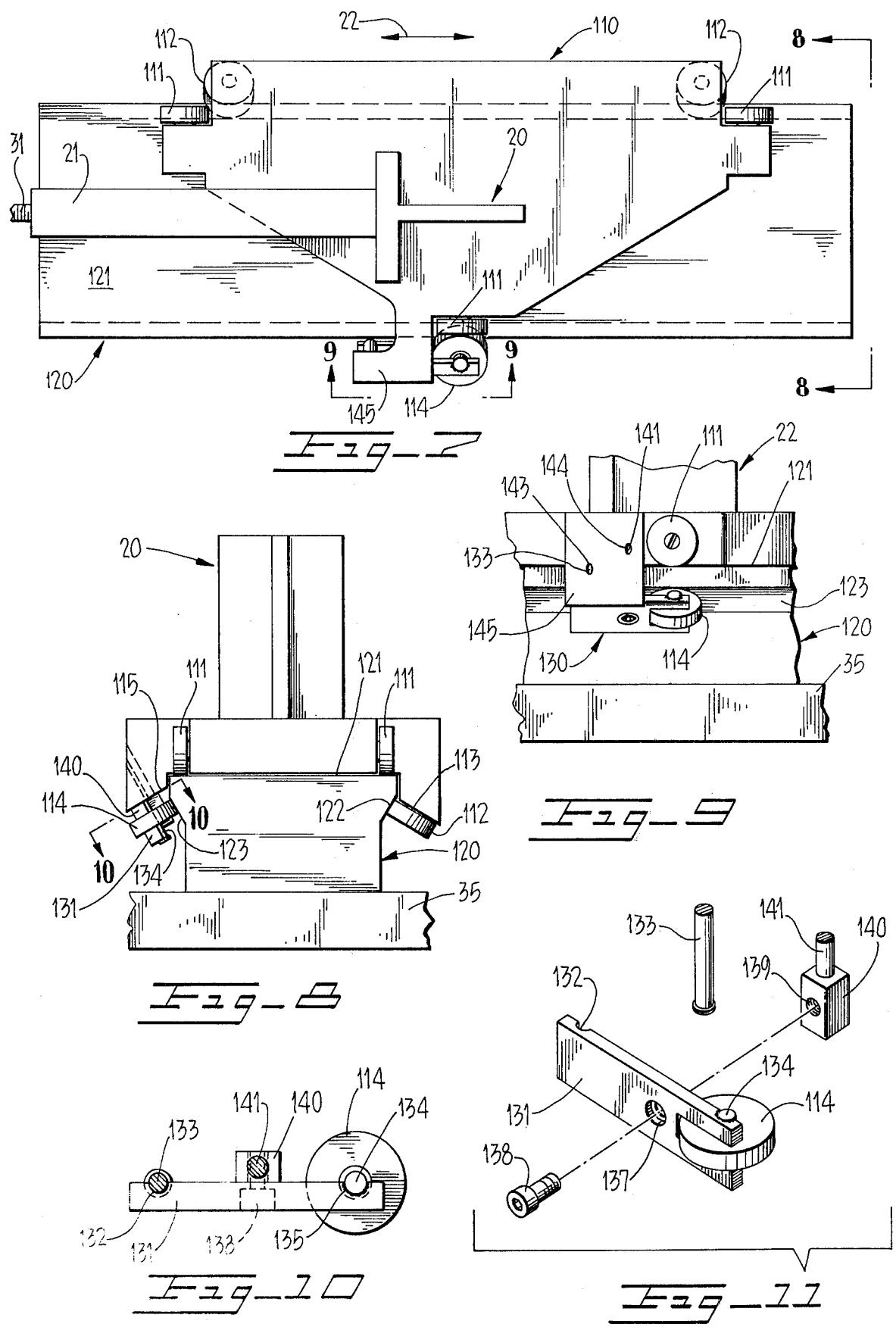

METHOD AND APPARATUS FOR WRITING SERVO-TRACKS ON ROTATING MAGNETIC MEMORY SURFACES

BACKGROUND OF THE INVENTION

This invention relates to the field of data storage and retrieval. More particularly, this invention relates to the provision of servo tracks in magnetic disc file units.

In the field of data processing, data is stored in binary digital form on rotating magnetic recording surfaces, such as the surface of a drum or the surface of a disc pack. A disc pack normally includes a plurality of discs fastened to a rotatable hub in a vertically spaced attitude, each disc having a recording surface on both sides. The disc pack is designed for use with a disc file unit having a motor and a spindle connected to the motor output shaft to which the disc pack may be releasably attached, and a bank of transducers mounted on a positioning mechanism for radially moving the transducer head assembly as a unit. Each transducer head in the transducer head assembly is associated to a different one of the disc pack recording surfaces and is adapted to record new data on the associated surface or read data from the surface under control of associated electronic equipment.

Data is recorded on the several surfaces in a circular track format, with each disc surface having a plurality of concentric tracks. Thus, in order to store or retrieve data from a specific track location, an arrangement must be provided for indexing the transducers over the individual tracks.

The conventional technique employed to provide track indexing is a servo surface. The servo surface comprises a dedicated surface of one of the discs in the pack on which a plurality of special tracks, called servo tracks, are prewritten when preparing a disc pack for use. Each servo track has a precisely defined radial width and comprises a series of spaced flux reversals, the spacing increasing with the radial distance of a given servo track from the center of the disc surface. The tracks are arranged in alternate even-odd series, with the sense of the track being determined by the order of the magnetic flux reversals. In an even servo track, the magnetic domains are arranged such that the equivalent electrical signal generated by a read transducer comprises a negative transition followed by a positive transition, while in an odd servo track the equivalent electrical signal comprises a positive transition followed by a negative transition.

In the past, servo tracks have been pre-recorded on a servo surface by using a write transducer with a gap width in the radial direction effectively equal to the desired width of a single track. For example, when writing servo tracks for single density disc packs, the write transducer employed to record the servo tracks has a $5.2 \times 10^{-3}$ inch radial gap width, which is equal to the radial width of a single density servo track. This arrangement enables a disc pack to operate in a single density mode in which the density of the data tracks on the disc pack data surfaces is approximately 192 tracks per inch. This arrangement for writing servo tracks suffers from the disadvantage that the write transducer must be manufactured to extremely close tolerances which increases the cost of the transducer required.

The single density servo tracks are written by mounting the disc pack on the disc file spindle of a servo track writing unit and actuating the motor to revolve the recording surfaces at a high speed, actuating the write transducer to record a first servo track on the outermost track of the servo surface, radially repositioning the write transducer to the next desired track position, i.e., $5.2 \times 10^{-3}$ inch radially inwardly while deactivating the write signals supplied from the associated electronic controller, re-energizing the write transducer to record the opposite servo track pattern (odd or even), and continuing this process until the entire servo surface is filled.

In addition to single density servo tracks, a double density servo track arrangement is also employed in the data processing industry. In a double density servo track format, the radial width of each track is $2.7 \times 10^{-3}$ inch which provides a data track density for the associated data storage surfaces of the disc pack of approximately 370 tracks per inch. In order to record a set of servo tracks in double density format in the known way, it has been the practice to employ a special servo track write transducer whose radial gap width is $2.7 \times 10^{-3}$ inch, and to employ the same track writing technique as that used for writing single density servo tracks described supra. This necessitates changing the track writing transducer by removing the single density transducer and installing the double density transducer. This requires substantial downtime for the servo track writer unit whenever it is necessary to change from one servo track density format to the other. This arrangement also suffers from the disadvantage that an additional supply of expensive write transducers is required: one for single density purposes, the other for double density purposes.

One approach used to facilitate recording of single and double density servo tracks is disclosed in U.S. Pat. No. 3,875,589. According to this technique, a pair of modular linear positioning units of special construction are provided, each of which can be attached to and removed from an associated servo track writer of special design. One positioning unit is designed to be used for writing single density servo tracks; the other is designed for use in writing double density servo tracks. While effective, this approach requires at least two precision constructed linear positioning units which are relatively expensive to manufacture, and also suffers from the disadvantage that the servo track writer must be shut down in changing from one density format to the other. Other attempts to provide both single and double density track writing capabilities in a single servo track writer have not met with wide success to date.

SUMMARY OF THE INVENTION

The invention comprises a method and apparatus for writing servo tracks on the servo surface of a disc pack which requires only a single, low-cost write transducer for writing both single and double density servo tracks and which can be switched from one density format to the other virtually instantaneously.

In the preferred embodiment, the apparatus includes a write transducer whose radial gap width is no less than the width of the widest servo track to be recorded and which is mounted to the transducer positioning assembly in the servo surface position, and transducer positioning means for radially translating the write transducer by a first distance when single density servo tracks are to be written, and by a second distance when double density servo tracks are to be written. The transducer positioning means includes a drive motor coupled to the input gear of a driving shaft, an output gear driven by the input gear via, a slip clutch mechanism, a transducer assembly slide block mounted for translational movement in a base guide member, an output drive shaft threadably engaged with the transducer slide block, and means for enabling incremental rotation of the drive shaft at at least two different rates in response to rotation of the output gear.

The means for providing incremental rotation of the drive shaft includes a first gear means mounted on the output drive shaft in engagement with the output gear of the driving shaft, a second gear means having a different pitch mounted on the output drive shaft at a different location from the first gear means, and a pair of pivotable pawls mounted for independent operation by a pair of solenoids.

With the disc pack mounted and rotating at the proper speed, the method proceeds by initializing the position of the servo write transducer at one edge of the desired servo band, writing a preliminary track having a width equal to the gap width of the write transducer, radially translating the write transducer by a predetermined amount equal to the desired servo track width, erasing the overlapping portion of the preliminary track to trim the track to the desired width, writing another preliminary track and sequentially translating and erasing successively written preliminary tracks until the entire set of servo tracks has been recorded.

For a fuller understanding of the nature and advantages of the invention, reference should be had to the ensuing detailed description taken in conjunction with the accompanying drawing.

BRIEF DESCRIPTION OF THE DRAWINGS

FIG. 1 is a side elevational view partially broken away of a disc file unit embodying the invention;

FIG. 2 is a schematic perspective view illustrating a transducer assembly drive arrangement;

FIG. 3 is a partial top plan view of a magnetic disc surface schematically illustrating the servo band;

FIG. 4 is a perspective view of a magnetic transducer;

FIGS. 5A–C are schematic sequential views illustrating the method of the invention;

FIG. 7 is a top plan view of an alternate transducer assembly mounting means;

FIG. 8 is an end elevational view of the mounting means of FIG. 7;

FIG. 9 is an enlarged side elevational view taken along lines 9—9 of FIG. 7;

FIG. 10 is a sectional view taken along line 10—10 of FIG. 8;

FIG. 11 is an exploded perspective view of the elements shown in FIG. 10; and

DESCRIPTION OF THE PREFERRED EMBODIMENTS

Figure 12:
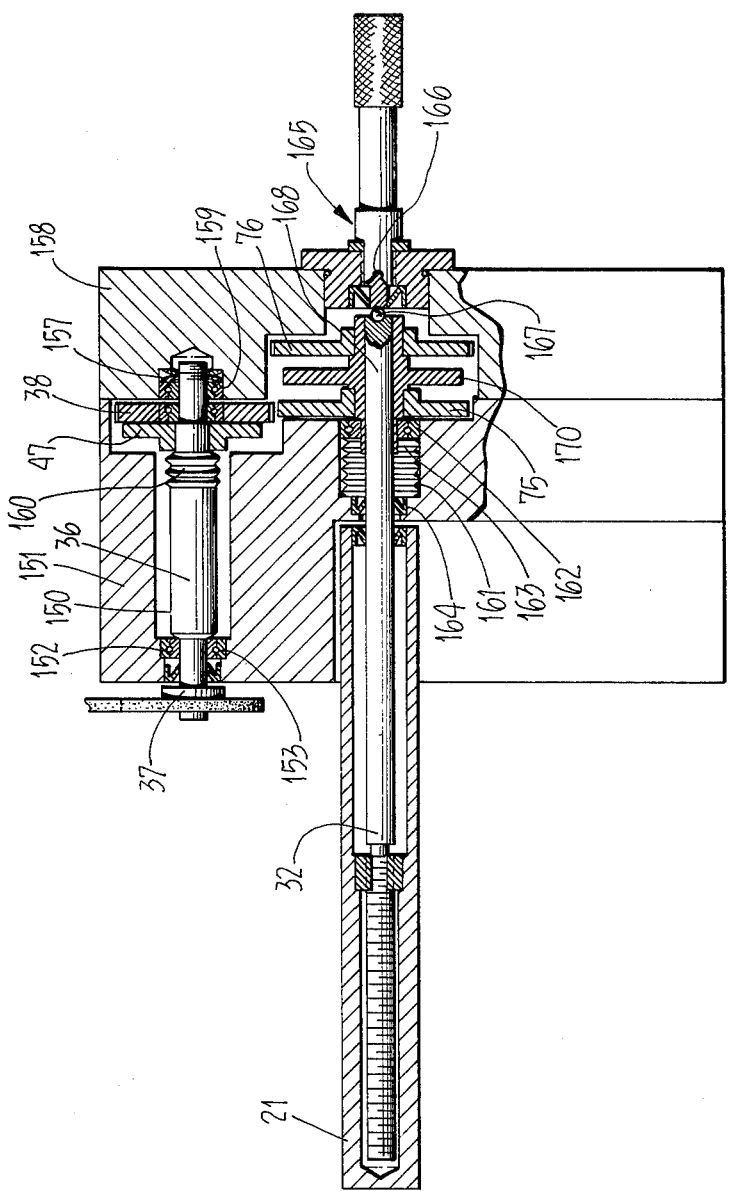
FIG. 12 is a top plan view partially in section showing a preferred embodiment of the transducer positioning assembly.

Turning now to the drawings, FIG. 1 is a side elevational view partially broken away of a servo track writer unit generally designated by reference numeral 10 incorporating an embodiment of the invention. As shown in this Fig., a cabinet 11 is provided with a removable cover portion 12 for permitting access to a chamber 13 in which a magnetic disc pack may be detachably mounted for rotation by a disc drive apparatus. The structure of the disc pack mounting means and rotary drive unit is conventional and well known: accordingly, further details have been omitted to avoid prolixity. Briefly described, the disc pack comprises a central hub portion which is adapted to be releasably secured to a driving spindle driven by a motor at a predetermined substantially constant angular speed.

The disc pack is provided with a plurality of vertically spaced discs 15 partially visible in FIG. 1, each provided with a coating of a magnetizable material in order to permit data in the form of binary characters to be written on to these magnetizable surfaces by means of individual magnetic transducers 16 associated to individual ones of the disc surfaces and carried by a conventional transducer head assembly generally designated by reference numeral 20.

Transducer head assembly 20 is mounted on a translatable slide block 21 which is bi-directionally moveable radially of the disc surfaces in the directions indicated by double ended arrow 22 by means of a transducer drive apparatus 23.

One of the surfaces of one of the discs 15 is provided with pre-recorded servo-track information which is never erased under ordinary operating conditions and which provides positioning information for specifying data track locations on the remaining disc surfaces so that the transducer head assembly may be accurately positioned over the center of the data tracks. All information is coupled between the magnetic transducers 16 and an associated conventional electronic controller by means of a bus 24.

With reference to FIG. 2, slide block 21 has a generally inverted T-shaped cross-section with a pair of opposed outwardly extending base flanges 26 which are received in complementary grooves within a base block 30. Slide block 21 is provided withh an internally threaded longitudinally extending bore into which an externally threaded end 31 of a driven shaft 32 is threadably engaged. As will be apparent to those skilled in the art, rotation of driven shaft 32 in a first sense translates slide block 21 and head assembly 20 radially inwardly of the disc surfaces, while rotation of driven shaft 32 in the opposite sense translates transducer head assembly 20 radially outwardly of the disc surfaces.

Figure 6:
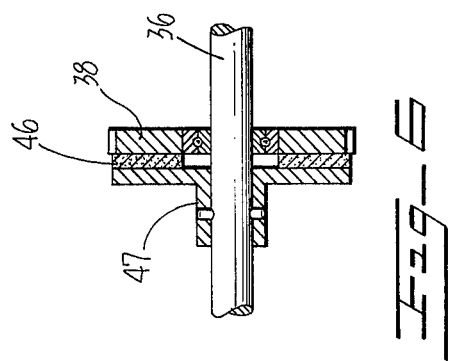
FIG. 6 is a sectional view taken along lines 6—6 of FIG. 2.

Rotatably mounted by means of bearing plates 33, 34 secured to the disc file unit base plate 35 is a driving shaft 36 having an input gear 37, an output gear 38 and a slip clutch assembly 40. The input gear 37 is pinned to shaft 36 and driven via a driving link 41, e.g. a chain or belt, which is coupled to an output gear 42 mounted on the output shaft 43 of a conventional motor 44. Output gear 38 is rotatably received on driving shaft 36 in a conventional manner and is driven by the surface friction between one face thereof and a conventional friction clutch pad 46 of clutch assembly 40 (see FIG. 6).

A pair of latching pawls 50, 51 are secured to a rod 53 rotatably mounted in bearing end plate 34 and a bearing end plate 54 secured to disc file unit base 35. Pawls 50, 51 are substantially identical in configuration and include driven arms 55, 56 and latching arms 57, 58, respectively, extending in opposite directions. Driven arm 55 is secured to an armature 60 of a first solenoid 61 by means of a connecting pin 62; similarly, driven arm 56 is secured to an armature 64 of a second solenoid 65 by means of a connecting pin 66. A spring 68 is secured between driven arm 55 and a stationary reference rod 70; similarly a spring 71 is secured between driven arm 56 and stationary reference rod 70.

Latching arms 57, 58 are provided with angled gear nibs 72, 73 for mating engagement with the individual teeth of gears 75, 76, respectively. Gears 75, 76 are pinned to driven shaft 32, with the teeth of gear 75 enmeshed with the teeth of output gear 38.

Solenoids 61, 65 are independently actuated by a pair of control units 80, 81 which are of conventional construction. Briefly described, solenoid control units 80, 81 each includes circuitry for providing driving current for solenoids 61, 65, respectively, in order to retract the respective armatures 60, 64 into the central body portion of solenoids 61, 65. Spring members 68, 71 normally maintain arms 55, 56 in the cocked position illustrated for pawl 50 so that gear nibs 72, 73 engage the teeth of the associated gear 75, 76.

In operation, with motor 44 running, input gear 37 is driven by driving link 41 to rotate the driving element 47 of clutch assembly 40. If either one, or both, of solenoids 61, 65 are disabled, one or both of the gear nibs 72, 73 engage the teeth of respective associated gears 75, 76 to prevent rotation of output drive shaft 32. When both solenoids 61, 65 are actuated by control units 80, 81, pawls 50, 51 are pivoted counterclockwise as viewed in the FIG. 2 to their extreme position in which gear nibs 72, 73 are disengaged from the teeth of associated gears 75, 76, and output drive shaft 32 is free to rotate. As output drive shaft 32 rotates, slide block 21 is translated in either a radially inward or radially outward direction, depending upon the sense of rotation of motor 44, and the transducer head assembly 20 follows this motion.

The transducer head assembly 20 may be incrementally stepped in either direction by holding one of solenoids 61, 65 in the actuated position illustrated for solenoid 65 and repetitively actuating and deactuating the remaining solenoid. When operated in this manner, output gear 38 of shaft 36 rotates driven shaft 32 an angular distance which is dependent upon the angular rotation of either gear 75 or gear 76 permitted by the associated latching pawl 50, 51, depending on the solenoid which is being repetitively actuated. For example, if solenoid 65 is held fully actuated by control unit 81 and solenoid 61 is intermittently operated by control unit 80, the incremental angular rotation of driven shaft 32 is dependent upon the number of teeth permitted to pass gear nib 72 while solenoid 61 is in the actuated condition. Similarly, if solenoid 61 is held fully actuated by control unit 80 and solenoid 65 is intermittently operated by control unit 81, the incremental angular rotation of driven shaft 32 is dependent upon the number of teeth permitted to pass gear nib 73 while solenoid 65 is in the actuated condition. Knowing the angular speed of motor output shaft 43, and the reduction ratio of gears 42, 37, 38, 75 and 76, the number of teeth per unit time passing gear nib 72 or 73 may be simply calculated and the actuation time of solenoid 61 or 65 required to permit a prescribed number of teeth to pass gear nib 72 or 73 may be readily determined. Since the distance by which transducer head assembly 20 is translated is directly dependent on the degree of angular rotation of driven shaft 32, which in turn is dependent upon the number of teeth passing gear nib 72 or 73 between successive engagements, the incremental translation of transducer head assembly may be directly controlled by control unit 80 or 81. This principle is employed to write servo-tracks on the servo surface of a disc pack in the following manner.

With reference to FIG. 3, a radial segment of a top plan view of a servo surface is illustrated, with the servo-tracks schematically depicted thereon. It is understood that these tracks are not normally visible to the naked eye, although it is possible to produce photographic reproductions with patterns resembling those depicted. As shown in this Fig., the disc is provided with an outer guard band 90, which comprises a plurality of odd servo-tracks used to assist the location of track zero during magnetic transducer loading and re-zeroing operations, and a plurality of alternating even servo-tracks 91a and odd servo-tracks 91b. In keeping with conventional practice, the servo-tracks are shown as staggered with the narrow transition regions 92a of the even servo-tracks 91a located at the mid-point between transition regions 92b of the odd servo-tracks 91b. As illustrated, the track dimensions are greatly exaggerated; the normal track density for single density servo-track formats being approximately 192 tracks per inch, while the track density of a double density servo-track format being approximately 370 tracks per inch.

FIG. 4 is a schematic view of a typical magnetic transducer used to record servo-tracks in the manner of the invention. As shown in this Fig. transducer 95 includes a pole piece 96, an electrically conducting coil 97 terminating in input leads 98, 99 and a gap 100. The magnetic flux bridging gap 100 may be made to change directions by the application of suitable electrical drive signals to input terminals 98, 99 in accordance with known techniques. These fluctuations are then recorded in the form of magnetic domain orientation on a recording surface traveling in the direction indicated by arrow 101. Gap 100 has a length L, which is dimension in accordance with conventional techniques, and a gap width W sized in accordance with the teachings of the invention to enable single and double density track writing with one single transducer 95. Transducer 95 is mounted for movement in the direction of arrow 22, (FIG. 1) i.e. radially of the servo surface of the associated disc pack.

FIGS. 5A–C illustrate sequential steps in the recording of servo tracks of either single density or double density in accordance with the method of the invention. Initially, with the magnetic servo surface neutralized and moving in the direction of arrow 101, the write transducer is positioned at the initial servo-track position, which is typically the outermost servo-track, and a complete set of equally spaced track transitions 92a' are recorded to provide a preliminary track of width W. Next, the write transducer is stepped radially inwardly a predetermined radial distance equal to the desired width of a servo-track, i.e. $5.2 \times 10^{-3}$ inch for single density tracks or $2.7 \times 10^{-3}$ inch for double density tracks, and the transducer is operated in the erase mode to trim the intially written track to the desired size. Thereafter, a second preliminary track having a width W and equally spaced odd servo transitions 92b' is recorded on the servo surface. The transducer is again translated radially inwardly by the same predetermined distance, is operated in the erase mode to trim back the second track to the desired track width, and a third preliminary track having width W and equally spaced even transitions 91a' is recorded. This process continues until the entire set of servo-tracks, and the inner guard band, have been recorded.

In the apparatus shown in FIG. 2, gear 38 is provided with 48 teeth, and pawl 50, solenoid 61, and gear 75 are employed for writing double density servo-tracks. Gear 75 is provided with 52 teeth and pawl 50 is disengaged by actuating solenoid 61 to permit only one tooth to pass under gear nib 72 per solenoid actuation. Pawl 51, solenoid 65 and gear 76 are employed to write single density servo-tracks. Gear 76 is provided with fifty-four teeth and solenoid 65 is operated to permit two teeth to pass under gear nib 73 per actuation of solenoid 65. As will be apparent to those skilled in the art, gears having different numbers of peripheral teeth may be employed, depending upon the pitch of screw portion 31 of output driving shaft 32.

FIGS. 7-11 illustrate a preferred embodiment of the carriage and ways for supporting transducer assembly 20. A carriage 110 is translatably mounted on ways 120 for motion in the direction of arrow 22 in response to rotation of threaded portion 31 of the driven shaft 32. Carriage 110 is provided with a plurality of wheels 111 rotatably secured to vertical edge portions thereof, the wheels 111 resting on the top surface 121 of ways 120. Lateral stability for carriage 110 is provided by a first pair of wheels 112 each of which is rotatably secured to the lower inwardly angled edge 113 of carriage 110 and an additional wheel 114 adjustably secured to inwardly angled edge 115 on the opposite side of carriage 110. Wheels 113 are engaged in surface contact with a beveled portion 122 of a first sidewall of ways 120; wheel 114 is engaged in surface contact with beveled portion 123 of the opposite sidewall of ways 120. Wheel 114 is adjustably mounted by means of mounting mechanism generally designated by reference numeral 130 and illustrated in FIGS. 8-11.

As shown in these Figs., mounting means 130 includes an arm 131 having a first groove 132 to which a pivot pin 133 is permanently secured, e.g. by an epoxy resin cement. The other end of arm 131 is slotted to receive the body of wheel 114 which is rotatably secured thereto by means of a pin 134 secured to a second groove 135 by suitable cement. Arranged substantially centrally along the longitudinal axis of arm 131 is a through bore 137 which receives a threaded bolt 138. The inner end of bolt 138 is threadably engaged in a threaded bore 139 in a base block 140 to the upper surface of which a mounting pin 141 is attached. Pins 133 and 141 are received in angled bores 143, 144 formed in a lateral extension 145 of carriage 110 at an angle normal to surface 115.

To attach carriage 110 to ways 120, the carriage 110 minus assembly 130 is fitted onto ways 120 with wheels 111 in contact with the upper surface 131 of ways 120, and wheels 112 in surface contact with beveled portion 122 of one sidewall. Pins 133 and 141 are inserted into bores 143, 144 and bolt 138 is threaded into bore 139 of base block 140. Bolt 138 is tightened until the surface of wheel 114 engages beveled portion 123 of the remaining sidewall of ways 120 with sufficient force to prevent lateral movement of carriage 110 in traveling along ways 120 in the direction of arrow 22.

FIG. 12 is a top plan view partially in section of a preferred embodiment of the transducer positioning assembly. As seen in this Fig., driving shaft 36 is mounted in a bore 150 in a housing 151 by means of bearing mounts 152 provided in a counter bore 153. A packing gland 154 is provided for fluid sealing purposes. The other end of shaft 36 is bearing mounted in a bore 157 in a second housing 158 by means of bearing mount 159. A belleville washer 160 provides proper axial thrust for shaft 36 in a conventional manner.

Driven shaft 32 is rotatably mounted in a bore 161 by means of bearing mount 162, and belleville washer 163 provides proper axial thrust therefore. A packing gland 164 provides a fluid seal for bore 151. A conventional manually manipulable micrometer assembly generally designated by reference numeral 165 is secured to housing 158 at the inner end of shaft 32 and the inner end 166 of micrometer assembly 165 engages a ball 167 against the recessed inner end 168 of driven shaft 32 in order to provide fine position adjustment in a conventional manner.

The open volume comprising bores 150, 157, 161 and volume 170 are preferably filled with a lubricating fluid such as oil in order to decrease overall friction and wear of the various elements.

Operation of the FIG. 12 embodiment is substantially identical of that described above with reference to FIG. 2.

For clarity, the pawls 50, 51 and solenoid 61, 65 are omitted from FIG. 12 for clarity. It is understood, however, that rotation of driven shaft 32 is controlled by engaging gear nibs 72, 73 with gears 75, 76 in the manner already described.

As will now be apparent, the invention provides the capability of writing both single and double density servo tracks on a servo surface of a rotating memory storage device without the necessity of interchanging write transducers when changing from one servo-track format arrangement to another. The track format can be changed from one density to the other nearly instantaneously by merely reversing the operation of solenoids 61 and 65. Thus, there is no appreciable down time required for the apparatus. It should be noted that major requirement of transducer 100 is that the effective gap width W be no less than the width of the widest track to be recorded; thus, a single transducer of conventional design may be used. Transducers suitable for this purpose are commercially available and an Infomag type 4042-S transducer having a gap width of 5.3±0.1 mil is preferably employed.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention which is defined by the appended claims.

What is claimed is:

1. A method of writing substantially concentric servo-tracks having a pre-determined width on the servo surface of a moveable magnetic storage device, said method comprising the steps of:
   a. translating said servo surface in a first direction past a write transducer having a gap width greater than said pre-determined width;
   b. recording a substantially circular preliminary track with said write transducer having a width greater than said predetermined servo-track width;
   c. translating said write transducer in a direction substantially normal to said first direction by an amount equal to said pre-determined servo track width;
   d. erasing overlapping portions of said preliminary track to form a substantially circular servo-track having said pre-determined width; and
   e. repeating steps (b) – (d) until the desired number of substantially concentric tracks has been recorded.

2. The method of claim 1 wherein said step (a) of translating includes the step of rotating said moveable magnetic storage device at a constant speed.

3. The method of claim 1 wherein said step (b) of recording includes the step of recording a preliminary track having a width substantially equal to the gap width of said write transducer.

4. The method of claim 1 wherein said predetermined width is equal to the width of a single density servo-track.

5. The method of claim 1 wherein said predetermined width is equal to the width of a double density servo-track.

6. An apparatus for writing substantially concentric servo tracks of first and second pre-determined widths of different magnitudes on the servo surface of a movable magnetic storage device, said apparatus comprising:
a write transducer having a gap width no less than the magnitude of the greater of said first and second pre-determined widths and adapted to be coupled to means for enabling said write transducer to write a series of substantially concentric tracks of width substantially equal to said gap width;
means for mounting said write transducer for translational movement along a first direction;
translating means adapted to be secured to said movable magnetic storage device for translating said servo surface past said write transducer in a second direction substantially normal to said first direction; and
drive means coupled to said mounting means for incrementally translating said write transducer along said first direction, said drive means including means for translating said write transducer along said first direction by a first pre-determined incremental amount substantially equal to said first predetermined track width after one of said series of substantially concentric tracks has been written by said write transducer and before the next one of said series of substantially concentric tracks has been written by said write transducer during writing of said servo-tracks of said first pre-determined width, and means for translating said write transducer along said first direction by a second predetermined incremental amount substantially equal to said second pre-determined track width after one of said series of substantially concentric tracks has been written by said write transducer and before the next one of said series of substantially concentric tracks has been written by said write transducer during writing of said servo tracks of said second pre-determined width so that said write transducer erases a portion of pre-determined substantially constant width of each previously written track during writing of a subsequent track to provide a servo track of desired width.

7. The combination of claim 6 wherein said mounting means includes a moveable member having a first threaded portion extending generally parallel to said first direction and wherein said drive means includes a rotatable output drive shaft having a second threaded portion in engagement with said first threaded portion, and means for incrementally rotating said output drive shaft by a first predetermined angular amount when writing tracks of said first predetermined width and by a second predetermined angular amount when writing tracks of said second predetermined width.

8. The combination of claim 7 wherein said first threaded portion comprises a threaded internal bore and said second threaded portion comprises an externally threaded rod.

9. The combination of claim 7 wherein said rotating means includes a pair of gears mounted on said output drive shaft at spaced locations therealong and having different predetermined pitches, a rotatable driving shaft having an output gear enmeshed with one of said output drive shaft gears, a slip clutch assembly for releasably driving said output gear, first and second pivotally mounted pawls each having a gear nib portion adapted to engage a different one of said gears on said output drive shaft, means for normally biasing each of said pawls in a direction in which the gear nib portion engages the corresponding gear, and control means for independently pivoting each said pawl in an opposite direction in which said gear nibs are disengaged from the corresponding output drive shaft gears.

10. An apparatus for writing a series of substantially concentric servo tracks of pre-determined width on the servo surface of a movable magnetic storage device, said apparatus comprising:
a write transducer having a gap width greater than said pre-determined width;
means for translating said servo surface in a first direction past said write transducer;
means for enabling said write transducer to record a series of substantially concentric tracks of width substantially equal to said gap width; and
means for incrementally translating said write transducer in a direction substantially normal to said first direction by an amount substantially equal to said pre-determined servo track width after recording a previous one of said series of substantially concentric tracks of widths substantially equal to said gap width and before recording of the next one of said series of substantially concentric tracks of width substantially equal to said gap width so that the width of said previous one of said series of substantially concentric tracks is reduced to said predetermined servo track width when the next one of said series of substantially concentric tracks is recorded.

11. The combination of claim 10 wherein said means for translating includes means for rotating said movable magnetic storage device at a constant speed.

12. The combination of claim 10 wherein said predetermined width is equal to the width of a single density servo track.

13. The combination of claim 10 wherein said predetermined width is equal to the width of a double density servo track.

14. In an information storage device having a rotatable magnetic storage element, a transducer for recording and reproducing information on said magnetic storage element, means for enabling said transducer to record and reproduce said information and a transducer positioning device, the improvement wherein said transducer positioning device comprises:
a housing;
a driving shaft rotatably secured in said housing along a first axis;
an input gear secured to said driving shaft and adapted to be coupled to a mechanical power source;
an output gear freely rotatably mounted on said driving shaft;

clutch means for releasably driving said output gear;
a driven shaft coupled to said transducer and rotatably secured in said housing along a second axis laterally spaced from said first axis and substantially parallel thereto;
a first gear secured to said driven shaft at a first axial location therealong and having a first pitch;
a second gear secured to said driven shaft at a second axial location therealong different from said first axial location and having a second pitch different from said first pitch;
one of said first and second gears being enmeshed with said output gear;

first and second pawl means each having a gear nib portion adapted to engage a different one of said first and second gears;
means for normally biasing said first and second pawl means to a first position in which each gear nib portion engages the associated one of said first and second gears; and
control means for selectively disengaging the gear nib portions of said first and second pawl means to enable said driven shaft to be intermittently rotated by incremental amounts dependent upon the pitch of said first and second gear means.

* * * * *